United States Patent
Foo

(10) Patent No.: US 7,352,122 B2
(45) Date of Patent: Apr. 1, 2008

(54) COMPACT FLUORESCENT LAMP WITH EXTENDED CAVITY TUBE

(75) Inventor: Onn Fah Foo, Kowloon, Hong Kong (CN)

(73) Assignee: Mass Technology (H.K.) Limited, Kowloon, Hong Kong (CN)

( * ) Notice: Subject to any disclaimer, the term of this patent is extended or adjusted under 35 U.S.C. 154(b) by 61 days.

(21) Appl. No.: 11/176,111

(22) Filed: Jul. 7, 2005

(65) Prior Publication Data

US 2006/0006779 A1  Jan. 12, 2006

(30) Foreign Application Priority Data

Jul. 8, 2004    (CH) ............... 2004 2 0073879 U
Sep. 27, 2004   (CH) ............... 2004 1 0078989 A

(51) Int. Cl.
     *H01J 17/44*     (2006.01)
(52) U.S. Cl. ..................... 313/493; 313/634
(58) Field of Classification Search ........... 313/490, 313/493, 491, 492, 639, 634
     See application file for complete search history.

(56) References Cited

U.S. PATENT DOCUMENTS

| 5,138,223 | A  | * | 8/1992 | Osada et al. ............... 313/488 |
| 7,067,981 | B2 | * | 6/2006 | Nishio et al. .............. 315/56 |
| 2006/0006783 | A1 | * | 1/2006 | Foo ....................... 313/490 |

* cited by examiner

*Primary Examiner*—Joseph L. Williams
(74) *Attorney, Agent, or Firm*—Alix, Yale & Ristas, LLP

(57) ABSTRACT

This present invention relates to a fluorescent lamp and, in particular, a compact fluorescent lamp or an enveloped fluorescent lamp with high surface load using new cold-end technology. The present invention includes at least one lamp tube with a cathode, stem cap and wire disposed at each end and forms a whole integral discharge cavity. A cavity tube connecting through the lamp tube is extended from at least one end of at least one lamp tube to form a light emitting zone and cold-end zone in the lamp tube. The advantages of the fluorescent lamp include: (1) best lamp working temperature can be adjusted within a wider range; (2) mercury-vapor pressure inside lamp tube can be adjusted to provide a stabilize working state; and (3) the cathode can be rapidly started, thus overcoming the slow starting problem of existing fluorescent lamps with amalgam.

4 Claims, 5 Drawing Sheets

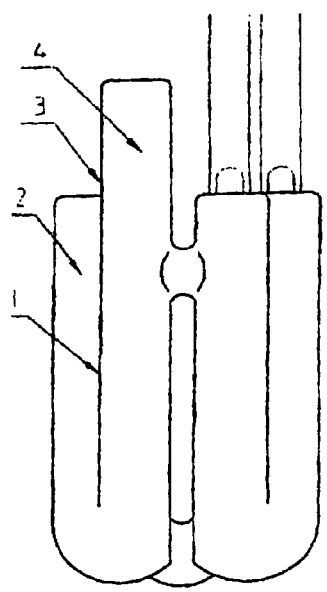 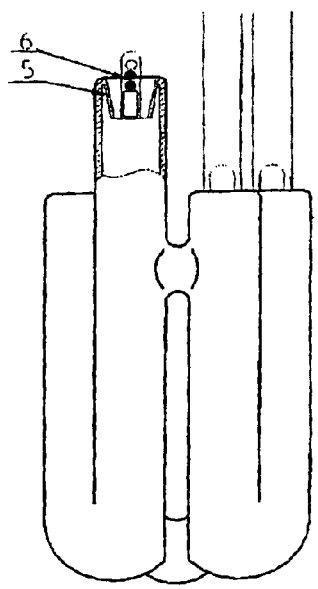 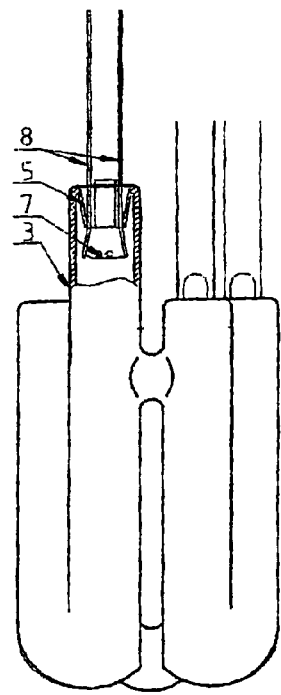
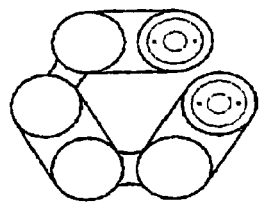 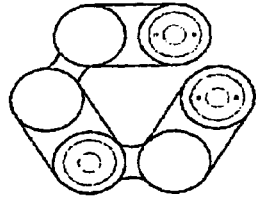 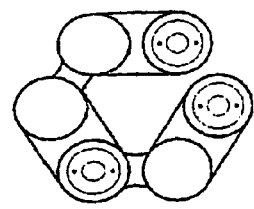
FIG. 1     FIG. 2     FIG. 3

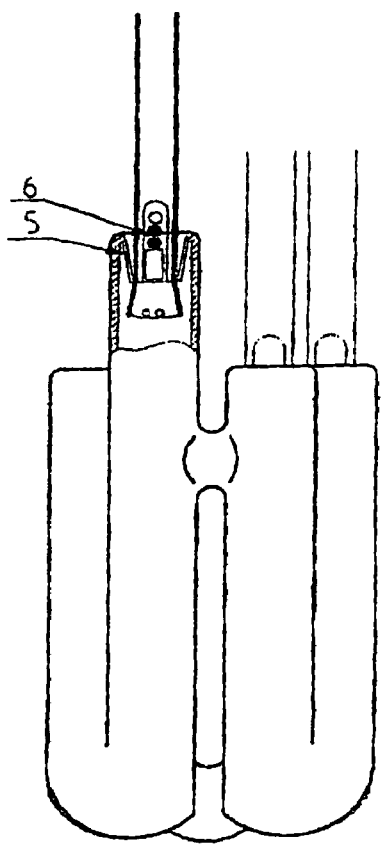
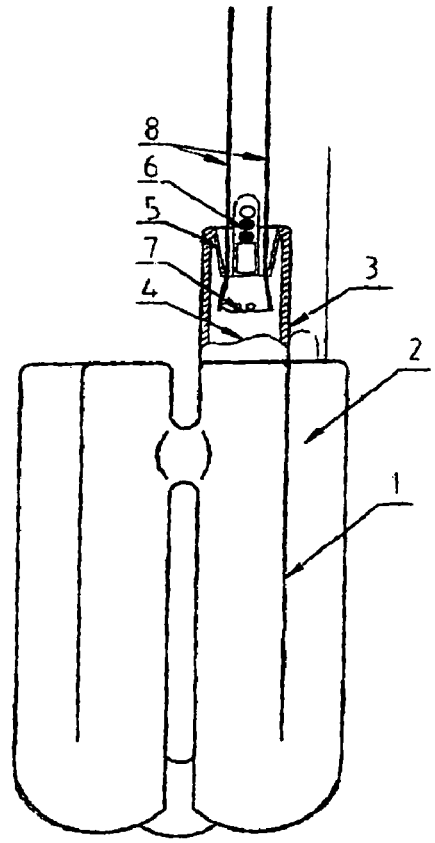
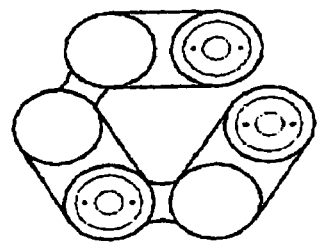
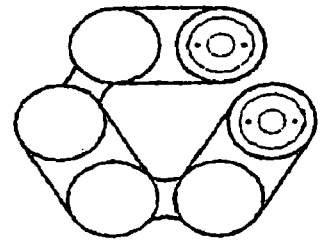
FIG. 4    FIG. 5

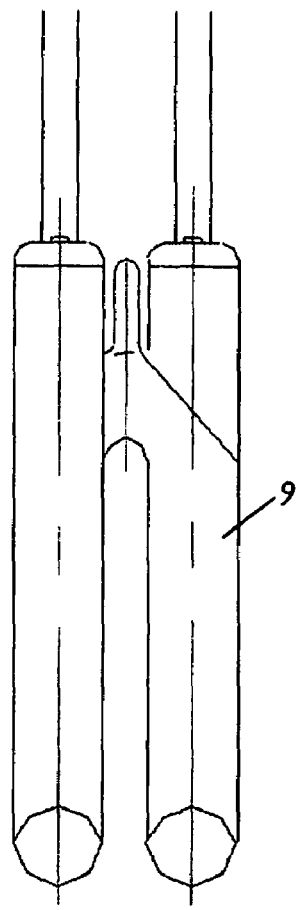 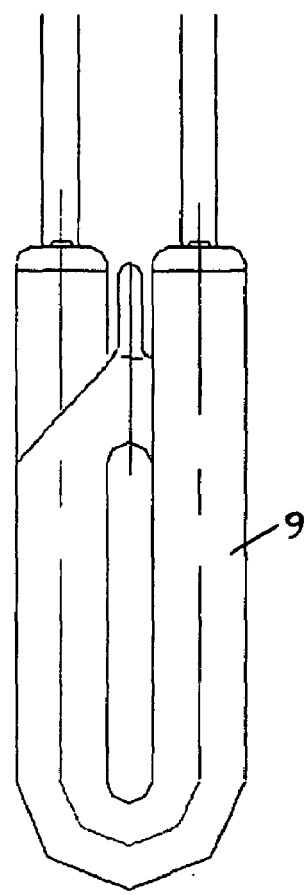
FIG. 6  FIG. 7
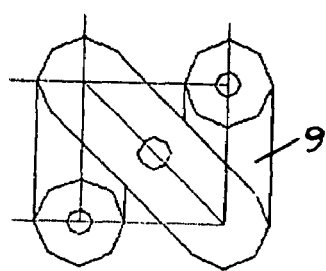
FIG. 8

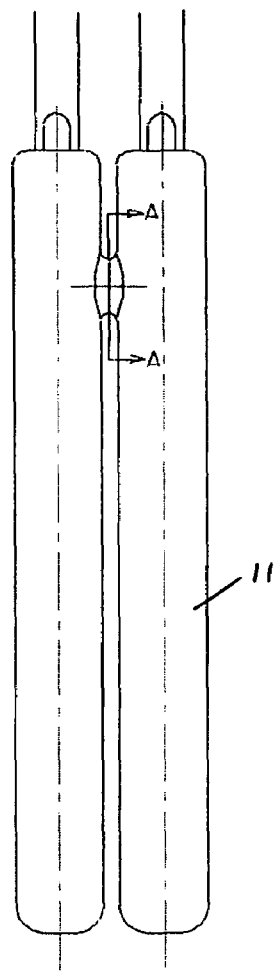
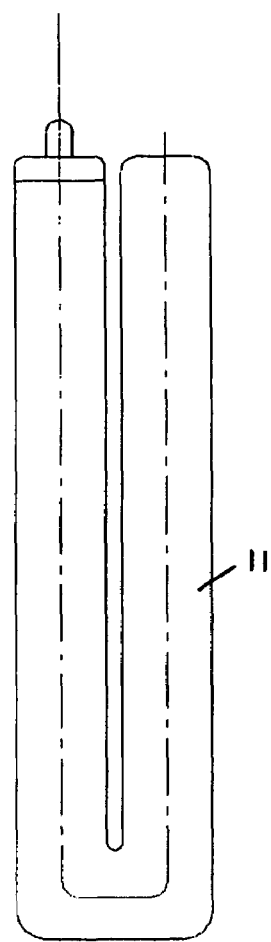
FIG. 12  FIG. 13
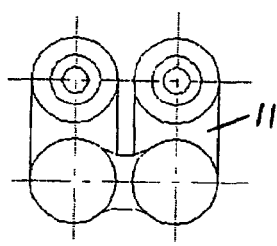
FIG. 14

COMPACT FLUORESCENT LAMP WITH EXTENDED CAVITY TUBE

FIELD OF THE INVENTION

This present invention relates to a fluorescent lamp and, in particular, a compact fluorescent lamp or an enveloped fluorescent lamp with high surface load using new cold-end technology.

BACKGROUND OF THE INVENTION

Existing compact fluorescent lamps are commonly made up of at least one lamp tube, cathode, stem cap and wire. With this type of compact fluorescent lamp, one end of the wire and the cathode are fixed on the stem cap and the other end is led out from the lamp tube. As a result, the whole inner cavity of the fluorescent lamp constitutes the discharge space, such that mercury-vapor pressure is commonly adjusted by partial tube wall at the coldest point; hence, its shortcomings include (1) relatively small adjustment range: it is impossible to achieve desirable effect if condition seriously departs from the norm; (2) difficult to make working state adjustment based on the intersectional effect between amalgam and tube wall at the coldest point for the fluorescent lamp using amalgam. "With the fluorescent lamps increasingly becoming more compact and diverse in characteristics, to a certain extent, it is not easy to obtain satisfactory working state adjustment in wider range with the old cold-end technology such that best effect on fluorescent lamp design is impacted greatly."

SUMMARY OF THE INVENTION

The object of the present invention is to provide a compact fluorescent lamp or an enveloped fluorescent lamp with high surface load which is capable of adjusting best lamp working temperature and pressure inside the lamp tube with wider range, and to provide stable working state and able to start the cathode rapidly. In order to achieve the foregoing object, a new cold-end technology is provided on the lamp tube.

The present invention comprises at least one lamp tube with a cathode, stem cap and wire at each end and forms a whole integral discharge cavity. A cavity tube connecting through the lamp tube is extended from at least one end of at least one lamp tube to form light emitting zone and cold-end zone in the lamp tube. The stem cap may be disposed at bottom end of cavity tube described previously and the amalgam may be disposed in the stem cap. Alternatively, the stem cap, cathode and wire may be disposed at the bottom end of the cavity tube, and one end of the wire connected to the cathode is fixed on the stem cap and the other end is led out from the cavity tube. In addition, the stem cap, cathode, amalgam and wire may be disposed at bottom end of cavity tube, and one end of the wire connected to the cathode is fixed on the stem cap and the other end is led out from the cavity tube, and amalgam is disposed in the stem cap.

The structures of the present invention described herein may be provided on lamp tubes with different diameters and shapes, such as compact fluorescent lamps or enveloped fluorescent lamps with commonly used diameters of 6-25 mm, and with different shapes, such as U-type, H-type, π-type, Buddha's Hand-shape-type, W-type, and SL-type, etc.

The advantages of the present invention includes: (1) best lamp working temperature can be adjusted within a wider range; (2) mercury-vapor pressure inside lamp tube can be adjusted to provide a stabile working state; and (3) the cathode can be rapidly started, thus overcoming the slow starting problem of existing fluorescent lamps with amalgam.

The various objects and advantages of the present invention will be more readily understood from the following detailed description when read in conjunction with the appended drawings.

BRIEF DESCRIPTION OF THE FIGURES

FIG. 1 is a schematic view of Example 1 of the present invention.

FIG. 2 is a schematic view of Example 2 of the present invention.

FIG. 3 is a schematic view of Example 3 of the present invention.

FIG. 4 is a schematic view of Example 4 of the present invention.

FIG. 5 is a schematic view of Example 5 of the present invention.

FIG. 6 is a schematic view of W-type lamp tube in Application Example 6 of the present invention.

FIG. 7 is a left-side view of FIG. 6.

FIG. 8 is a top view of FIG. 6.

FIG. 12 is a schematic view of 2π-type lamp tube in Application Example 8 of the present invention.

FIG. 13 is a left-side view of FIG. 12.

FIG. 14 is a top view of FIG. 12.

DETAILED DESCRIPTION OF THE PREFERRED EMBODIMENT

Application Example 1

Figure 9:
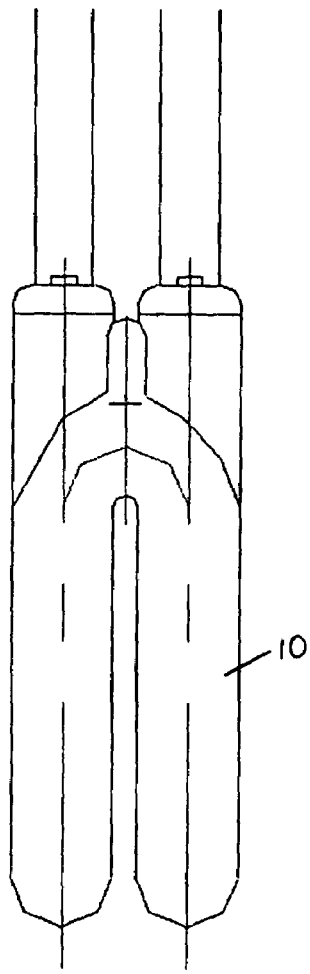
FIG. 9 is a schematic view of SL-type lamp tube in Application Example 7 of the present invention.

Referring to FIG. 1, the present invention includes three U-type lamp tubes 1 connecting through each other; a cavity tube 3 connecting through the lamp tube 1 is extended on one end of lamp tube 1 without cathode, stem cap and wire to form an integral unit with lamp tube 1 and constitutes light emitting zone 2 and cold-end zone 4 in the lamp tube. The diameter of cavity tube 3 is the same as that of the lamp tube 1. However length of the cavity tube 3 can be adjusted based on the requirement.

Application Example 2

Referring to FIG. 2, this Example is similar to Application Example 1, except that stem cap 5 is disposed on bottom end of the cavity tube 3, and amalgam 6 is disposed in the stem cap 5.

Application Example 3

Referring to FIG. 3, this Example is similar to Application Example 1, except that stem cap 5, cathode 7 and wire 8 are disposed on bottom end of the cavity tube 3, and one end of wire 8 connected to the cathode 7 is fixed on the stem cap 5 and the other end is led out from the cavity tube 3. Cathode 7 employs a heating filament.

Application Example 4

Referring to FIG. 4, this Example is similar to Application Example 3, except that the amalgam 6 is disposed in the stem cap 5.

Application Example 5

Referring to FIG. 5, cavity tube 3 is extended directly at one end of lamp tube 1 with cathode 7, stem cap 5 and wire 8 disposed at each of its end, to form an integral unit with lamp tube 1 and constitutes light emitting zone 2 and cold-end zone 4 in the lamp tube; stem cap 5 (amalgam 6 is disposed in the stem cap 5), cathode 7 and wire 8 are disposed on bottom end of the cavity tube 3, and one end of wire 8 connected to the cathode 7 is fixed on the stem cap 5 and the other end is led out from the cavity tube 3.

Application Example 6

Referring to FIGS. 6 to 8, this Example is similar to Application Example 5, except that a W-type lamp tube 9 is applied. Furthermore, the diameter of cavity tube extending from one end of the lamp tube is smaller than that of the lamp tube.

Application Example 7

Figure 10:
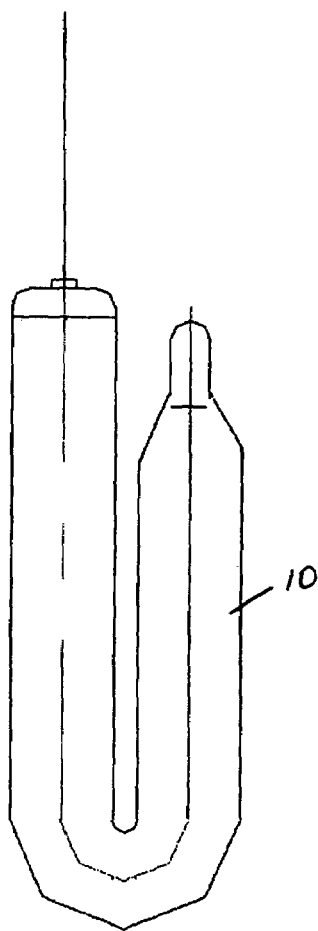
FIG. 10 is a left-side view of FIG. 9.
Figure 11:
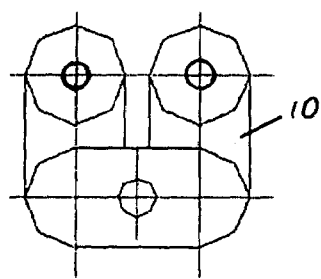
FIG. 11 is a top view of FIG. 9.

Referring to FIGS. 9 to 11, this Example is similar to Application Example 6, except that a SL-type lamp tube 10 is provided Application Example 8

Referring to FIGS. 12 to 14, this Example is similar to Application Example 6, except that a 2π-type lamp tube 11 is provided.

Application Example 9

This Example is similar to Application Example 6, except that H-type or Buddha's Hand-shape-type lamp tube is provided.

It is to be understood that the embodiments depicted in the patent specification herein are not intended to be, nor should it be deemed to be, limited thereby and such other modifications or embodiments without departing from the spirit and essential characteristics of such invention herein are particularly reserved especially as they fall within the breadth and scope of the claims here appended.

What is claimed is:

1. A compact fluorescent lamp, comprising at least one lamp tube, said lamp tube has a cathode, stem cap and wire disposed at each end and forms a whole integral discharge cavity, wherein a cavity tube connecting through said lamp tube is extended from at least one end of at least one said lamp tube to form a light emitting zone and cold-end zone in said lamp tube.

2. The fluorescent lamp of claim 1, wherein amalgam is disposed inside said stem cap, and wherein said stem cap containing said amalgam is disposed on bottom end of said cavity tube.

3. The compact fluorescent lamp of claim 1, wherein the diameter of said lamp tube is 6-25 mm.

4. The compact fluorescent lamp of claim 1, wherein said lamp tube is U-type, H-type, π-type, Buddha's Hand-shape-type, W-type or SL-type tube.

* * * * *

UNITED STATES PATENT AND TRADEMARK OFFICE
CERTIFICATE OF CORRECTION

| | | |
|---|---|---|
| PATENT NO. | : 7,352,122 B2 | Page 1 of 1 |
| APPLICATION NO. | : 11/176111 | |
| DATED | : April 1, 2008 | |
| INVENTOR(S) | : Foo | |

It is certified that error appears in the above-identified patent and that said Letters Patent is hereby corrected as shown below:

On the Title Page Item (30):

Delete "(CH)" in both instances and replace with --(CN)-- in both instances.

Delete "2004 1 0078989 A" and replace with --2004 1 0078389 A--.

Signed and Sealed this

Twenty-fourth Day of June, 2008

JON W. DUDAS
*Director of the United States Patent and Trademark Office*